Patented June 26, 1945

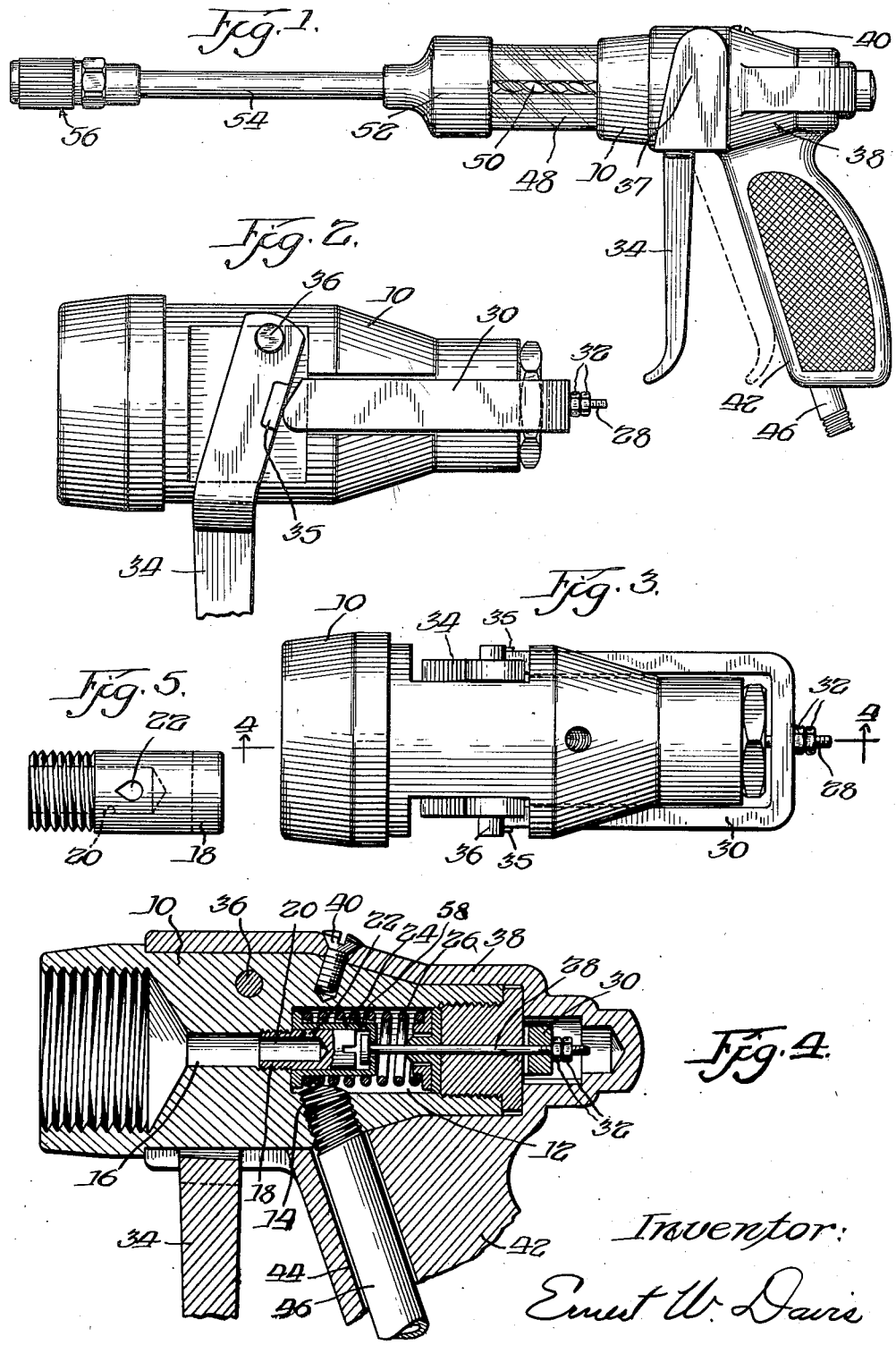

2,378,985

UNITED STATES PATENT OFFICE 2,378,985

LUBRICANT CONTROL VALVE

Ernest W. Davis, River Forest, Ill., assignor to Stewart-Warner Corporation, Chicago, Ill., a corporation of Virginia Application March 19, 1943, Serial No. 479,805

2 Claims. (Cl. 251—78)

My invention relates to lubricant control valves such as are used for controlling the flow of lubricant from a high pressure grease hose into a plurality of lubricant fittings installed on an automobile or other mechanism employing bearings requiring lubrication.

The general object of this invention is to provide a device of the class described which is convenient and efficient in operation.

A more specific object is to provide a lubricant control valve suitable for use with a high working pressure, and which can be operated with little physical effort.

Another object is to provide such a valve which will not leak while in its closed position, and which is self-cleaning in operation.

Another object is to provide a valve of the class described having extraordinary durability, and one in which objectionable "wire drawing" action is eliminated, as will be explained hereinafter.

Another object is to provide a lubricant control valve which enables an operator to discharge lubricant from a high pressure grease line at a moderate, selectively controlled, visually indicated rate of flow.

A further object is to secure the above named advantages without the necessity of employing close fitting parts, or high cost, precision workmanship. These and other objects will appear as the description proceeds.

In the drawing:

Figure 1 is a side elevation of the complete control valve of this invention.

Figure 2 is a side elevation of the body member and associated parts with the casing removed.

Figure 3 is a plan view of the structure shown in Figure 2;

Figure 4 is a longitudinal, sectional elevation of the body member with part of the casing included, the section being taken on the line 4, 4, in Figure 3; and Figure 5 is an enlarged plan view of the male valve member shown in Figure 4.

The body member 10 is provided with a lubricant cavity 12 having an inlet 14 and an outlet 16. The male valve member 18 is provided with a discharge port 20, and a throttling port 22. The female valve member 24 is arranged to slide over the male valve member 18, and is movable to positions which cover and uncover the throttling port 22.

The spring 26 urges the female valve member towards the left, so as to cover the throttling port 22. Sufficient tension on the valve rod 28 moves the female valve member 24 towards the right, so as to uncover the throttling port 22. The yoke 30 engages the nut 32 to produce movement of the valve rod 28 and female valve member 24 in a right hand direction, the yoke 30 being actuated by lugs 35 on the trigger 34, pivoted on the fulcrum pin 36, supported by the body member 10, and confined against longitudinal movement by the portion 37 of the casing 38. The casing 38 slides over the body member 10 and is retained by the screw 40. The handle portion 42 is integral with the casing 38, and has a bore 44, through which the pipe nipple 46 may be screwed into the inlet 14.

The tubular member 48, Figure 1, is constructed of transparent plastic material to provide visibility of the helical rotor 50, which is caused to rotate by the flow of lubricant through the tubular member 48, thereby providing a flow indicator for indicating the flow of lubricant through the control valve. The specific construction of such a flow indicator is described more fully in my copending application Serial Number 462,657, filed October 19, 1942.

The reducer fitting 52 is screwed over the tubular member 48 and supports the lubricant conduit 54, which conducts lubricant to the coupling 56, which is adapted for making a lubricant tight connection with a standard lubricant fitting such as those installed on automobiles and other mechanisms.

The operation of this control valve is as follows: When the nipple 46 is connected with a high pressure lubricant hose, the lubricant passes through the inlet 14 and fills the lubricant cavity 12. The lubricant is prevented from passing through the outlet 16 by virtue of the female valve member 24, which normally covers the throttling port 22. But when the trigger 34 is moved to the position indicated by the dotted lines in Figure 1, the lugs 35 engage the yoke 30, thereby moving the yoke 30 towards the right, so as to exert a pull on the valve rod 28, thereby causing the female valve member 24 to move towards the right to uncover the throttling opening 22. This produces a full flow of lubricant through the outlet 16, tubular member 48, conduit 54, and coupling 56, as will be readily understood. The small aperture 58 in the female valve member 24 permits lubricant to enter or leave the interior of the female valve member 24, so as to balance the lubricant pressure therein with the lubricant pressure in the lubricant cavity 12.

If a slow flow of lubricant is desired, the trigger 34 is moved a shorter distance, so as only partially to uncover the throttling port 22 by an amount sufficient to allow the desired rate of flow, as indicated by the movement of the helical rotor 50. The sides of the throttling port may be made tapered, as viewed from above, and as indicated in Figure 5, so as to permit a very slow rate of flow when the trigger 34 is moved only a slight distance.

When the trigger 34 is released, the spring 26 returns the female valve member 24, and the trigger 34, to their normal positions. The spring 26 is made rather heavy, and the diameter of the valve rod 28 is quite small so that the spring 26 is strong enough to move the valve rod 28 inwardly against the high pressure in the lubricant cavity 12. The lubricant pressure within the female valve member 24, acting on the valve rod 28, tends to move the valve rod 28 towards the right by a force equivalent to the product of the lubricant pressure inside the female valve member 24 and the cross sectional area of the valve rod 28. This aids in the operation of moving the trigger 34, so that the operator may operate the valve with little effort, which is one of the objects of this invention. Movement of the trigger towards the right is limited by contact with the handle portion 42, so as to prevent breakage of the valve rod 28 in case undue force is applied to the trigger 34.

The male valve member 18 and female valve member 24 are made of steel and hardened. A slight clearance between these valve members is not objectionable because the lubricant pressure holds the female valve member forcibly against the male valve member around the throttling port 22, thereby preventing leakage. This clearance permits making the valve parts by high production, manufacturing methods, so as to provide low manufacturing cost, which is an object of this invention.

In prior devices of this class considerable trouble has been experienced due to the objectionable "wire drawing" action of high pressure lubricant in flowing at high velocity through small orifices such as those required for controlling the flow. This so-called wire drawing produces microscopic cavities in the valves and seats, and the lubricant flow is thereby localized at these microscopic cavities, which are soon enlarged to a size that produces continual leakage, which is of course wasteful of lubricant and objectionable in other ways.

This wire drawing action seems to be incompletely understood. It was formerly thought to be the result of simple erosion caused by the high velocity of the stream of lubricant, but later theories ascribe the action of supersonic vibrations in the fluid, and resulting molecular separation, as the principal cause of wire drawing. This latter theory is supported by experiments in which wire drawing effects are produced without any flow in the contacting fluid, the pressure of which is alternately increased and decreased in very rapid succession throughout a prolonged time interval.

It seems that the shape of the restricted, fluid-conducting passage has an important effect on the wire drawing action. A passageway which converges in the direction of flow towards a highly restricted portion, and then diverges in the direction of flow, produces excessive wire drawing action. Cone shaped valves and seats, such as are commonly used in valves of this kind are therefore objectionable. In the valve of this invention, the flow-restricting portion comprises a throttling port which leads abruptly into a port of substantially greater area extending in a relatively transverse direction, thereby abruptly changing the direction of flow at the flow-restricting portion and thereby providing a valve which is particularly free from wire drawing action, which is an object of this invention.

I claim:

1. In a control valve for controlling the flow of lubricant therethrough at high pressure, the combination of a body member having a lubricant cavity therein and having an inlet and an outlet for said lubricant cavity; a tubular male valve member, open at one end, and closed at the opposite end, and having a transverse throttling port intermediate said ends, said port extending along substantially less than 180° of the circumference of the male valve member and the latter being positioned within said lubricant cavity with said open end connected with said outlet; a female valve member slidable over said male valve member to a covering position in which said throttling port is covered by said female valve member, and to an uncovering position in which said throttling port is uncovered by said female valve member; a manually operated movable member; means for transmitting motion from said manually operated member to said female valve member for moving said female valve member to said uncovering position; and other means for moving said female valve member to said covering position, the mean clearance between said valve members being sufficient to allow passage of lubricant therebetween at said high pressure, and said female valve member being biased in a direction radially inward towards said throttling port by said high lubricant pressure, so as to prevent leakage of lubricant through said throttling port when said throttling port is covered by said female valve member.

2. In a control valve for controlling the flow of lubricant therethrough at high pressure, the combination of a body member having a lubricant cavity therein, and having an inlet and an outlet for said lubricant cavity; a tubular male valve member, open at one end and closed at the opposite end, and having a transverse throttling port intermediate said ends, said throttling port extending along substantially less than 180° of the circumference of the valve member and the latter being positioned within said lubricant cavity with said open end connected with said outlet; a female valve member slidable over said male valve member to a covering position in which said throttling port is covered by said female valve member, and to an uncovering position in which said throttling port is uncovered by said female valve member; and manually controlled means for moving said female valve member to said covering position and to said uncovering position, the wall of said male valve member opposite said throttling port being imperforate, the mean clearance between said valve members being sufficient to allow passage of lubricant therebetween at said high pressure, and said female valve member being biased in a direction radially inward towards said throttling port by said high lubricant pressure, so as to prevent leakage of lubricant through said throttling port when said throttling port is covered by said female valve member.

ERNEST W. DAVIS.